(12) United States Patent
Tseng

(10) Patent No.: US 8,093,860 B2
(45) Date of Patent: Jan. 10, 2012

(54) CEILING FAN MOTOR WITH GENERATOR WINDING

(76) Inventor: Teng-San Tseng, Wufong Township, Taichung County (TW)

( * ) Notice: Subject to any disclaimer, the term of this patent is extended or adjusted under 35 U.S.C. 154(b) by 0 days.

(21) Appl. No.: 12/344,036

(22) Filed: Dec. 24, 2008

(65) Prior Publication Data

US 2011/0101923 A1 May 5, 2011

(51) Int. Cl.
*H01M 10/46* (2006.01)
(52) U.S. Cl. ........................................ 320/107
(58) Field of Classification Search .................. 320/101, 320/107, 128, DIG. 29; 310/67 A, 68 R, 310/89, 179, 254.1
See application file for complete search history.

(56) References Cited

U.S. PATENT DOCUMENTS

| | | | | |
|---|---|---|---|---|
| 4,737,701 A * | 4/1988 | Hoemann et al. | ............. | 318/772 |
| 5,905,322 A * | 5/1999 | Tsay | ............................ | 310/184 |
| 2003/0095880 A1* | 5/2003 | Mehta | ..................... | 417/423.13 |
| 2007/0036654 A1* | 2/2007 | Fedeli et al. | ............. | 416/169 R |
| 2008/0317616 A1* | 12/2008 | Yu | ................................ | 310/254 |

* cited by examiner

*Primary Examiner* — Edward Tso
(74) *Attorney, Agent, or Firm* — Wang Law Firm, Inc.; Li K. Wang

(57) ABSTRACT

A ceiling fan motor with a generator winding is disclosed. A stator is fixed on a motor axle. It is surrounded with several first magnetizing coils, each of which is winded with a second magnetizing coil with a generator winding. A rotor is mounted on the motor axle. The rotor has several magnetic objects around the stator. Each first magnetizing coil is affected by an input voltage to generate an inducing magnetic field for rotating the rotor with respect top the stator. The second magnetizing coil on the stator detects and receives a back electromotive force produced because the rotor rotates and cuts through the magnetic lines, thereby generating electrical power.

8 Claims, 7 Drawing Sheets

CEILING FAN MOTOR WITH GENERATOR WINDING

BACKGROUND OF THE INVENTION

1. Field of Invention

The invention relates to a ceiling fan motor and, in particular, to a ceiling fan motor with a generator winding.

2. Related Art

As shown in FIG. 7, the conventional energy-saving generator device mainly has a generator 3 installed on the axle 2 of a motor 1. When electrical power drives the axle 2 of the motor 1 to rotate, it concurrently drives the generator 3 to generate electrical power. The generator 3 is connected with a power adjuster 4, a charging controller 5, and a battery cell 6. This achieves the goal of saving energy by making use of the electrical power generated by the generator 3.

However, the above-mentioned energy-saving generator device in practice has the load of driving the generator 3 in addition to its original load. Therefore, it requires a larger voltage in order to smoothly drive the motor 1 and the generator 3 at the same time. Therefore, the conventional energy-saving generator device cannot really achieve the effect of saving energy.

Moreover, the generator 3 in the energy-saving generator device has stator and motor structures in addition to the necessary housing. Therefore, the production cost cannot be reduced.

It is the purpose of the invention to solve the above-mentioned problems by providing a ceiling fan motor with better energy-saving effects.

SUMMARY OF THE INVENTION

An objective of the invention is to provide a ceiling fan motor with a generating winding that has the additional function of generating power without increasing too much of motor load, thereby saving the energy.

Another objective of the invention is to provide a ceiling fan motor with a generator winding that has a lower production cost and does not increase the volume of the motor.

A further objective of the invention is to provide a ceiling fan motor with a generator winding that has a energy-saving means to generator electrical power from inertia even when the ceiling fan is not supplied with power. This can effectively increase the power generating efficiency.

To achieve the above objectives, the disclosed ceiling fan motor with a generator winding has a stator and a rotor. The stator is fixed on a motor axle and surrounded with a plurality of first magnetizing coils. Each of the first magnetizing coils is further winded with a second magnetizing coil with a generator winding. The rotor is pivotally mounted on the motor axle. The rotor has several magnetic objects around the stator. Each of the first magnetizing coils is driven by an input voltage to produce an induced magnetic field for rotating the rotor with respect to the stator. The second magnetizing coil of the stator detects and receives a back electromotive force (e produced because the rotor rotates and cuts through the magnetic lines, thereby generating electrical power.

The ceiling fan motor of the invention has an energy-saving driver controlling circuit and a power distribution controlling circuit. The energy-saving driver controlling circuit is electrically connected with the first magnetizing coils, and receives the input voltage and controls the electrical current phases of the first magnetizing coils. The rotor continues to rotate with respect to the stator and builds up an inertia. The power distribution controlling circuit is electrically connected with the second magnetizing coil, and converts the back emf detected and received by it into an electrical power for output.

Moreover, the energy-saving driver controlling circuit provides an energy-saving control means that supplies the input voltage in an intermittent way to start the energy-saving driver controlling circuit. When the energy-saving driver controlling circuit receives the input voltage, it controls the ON time of each of the first magnetizing coils. The rotor thus rotates with respect to the stator and maintains its inertia. When the energy-saving driver controlling circuit does not receive the input voltage, the rotor continues to rotate with respect to the stator due to inertia. In this case, the rotor still cuts through the magnetic line and generates a back emf. Therefore, when the energy-saving driver controlling circuit does not receive the input voltage, the power distribution controlling circuit can still use the back emf detected and received by the second magnetizing coil to generate electrical power.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Please refer to FIGS. 1 to 4. The invention provides a ceiling fan motor with a generator winding that mainly consists of a motor axle 11, a stator 21, and a rotor 31.

Figure 1:
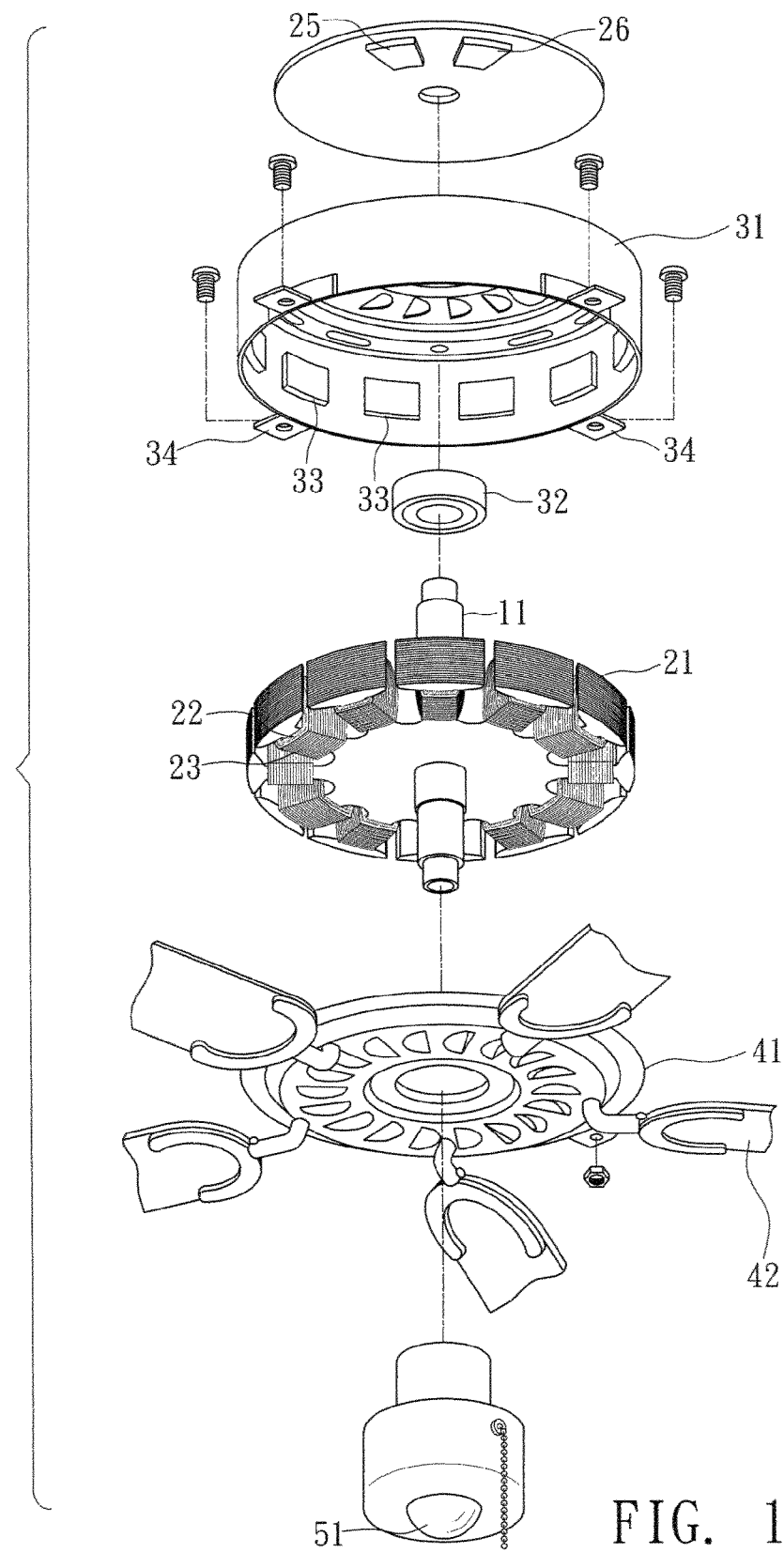
FIG. 1 is a three-dimensional exploded view of the invention.
Figure 2:
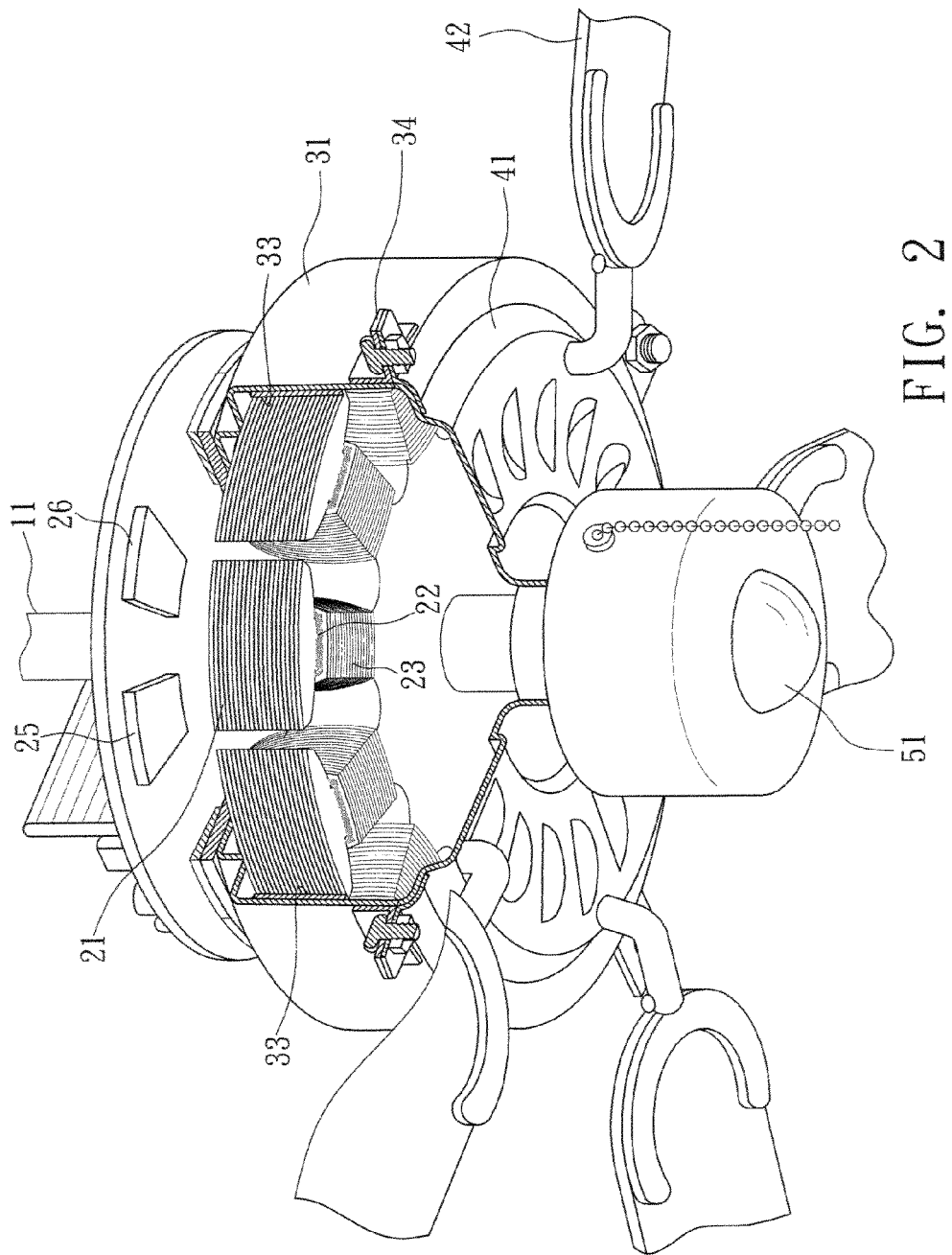
FIG. 2 is a schematic view of the invention after it is assembled.
Figure 3:
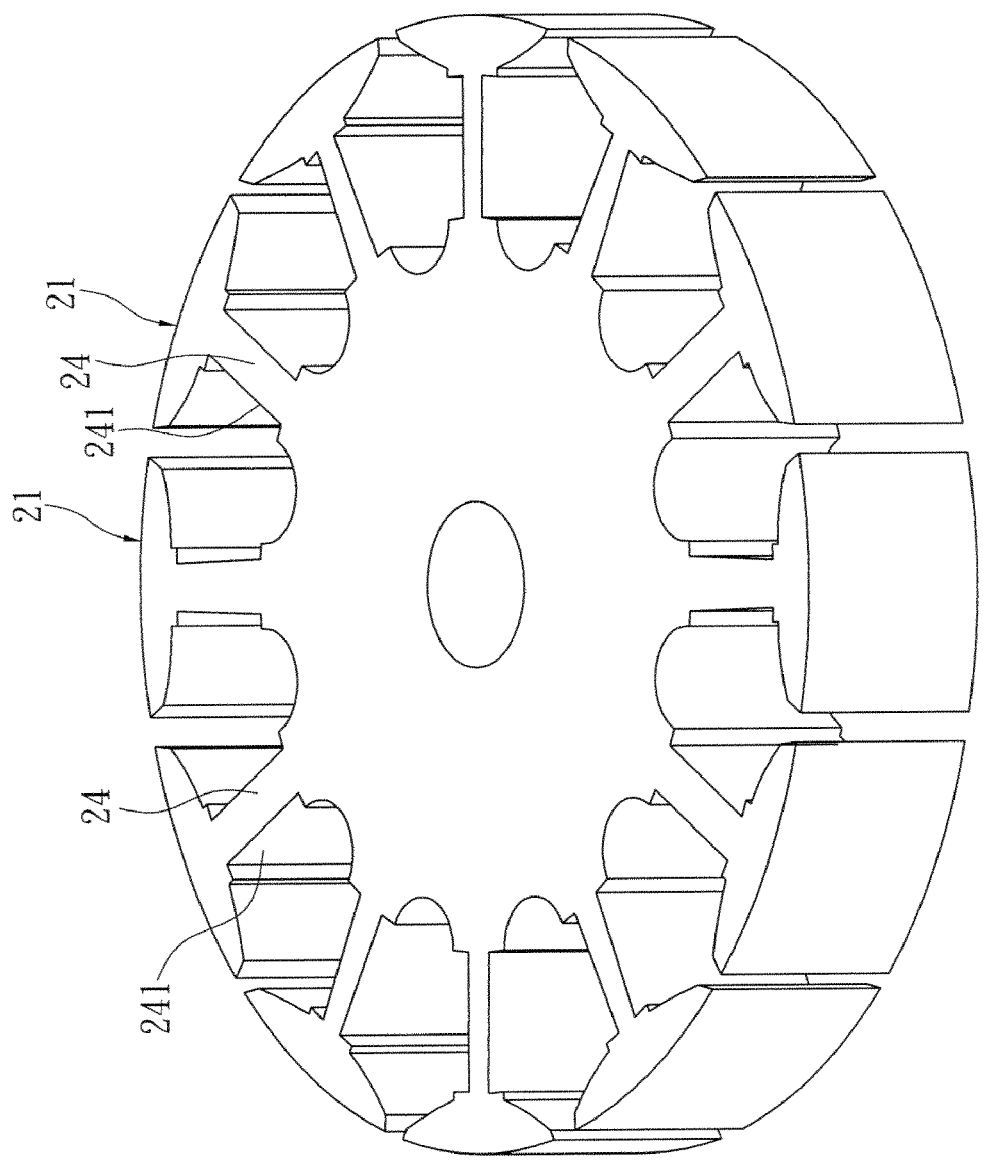
FIG. 3 is a three-dimensional view of the disclosed stator.
Figure 4:
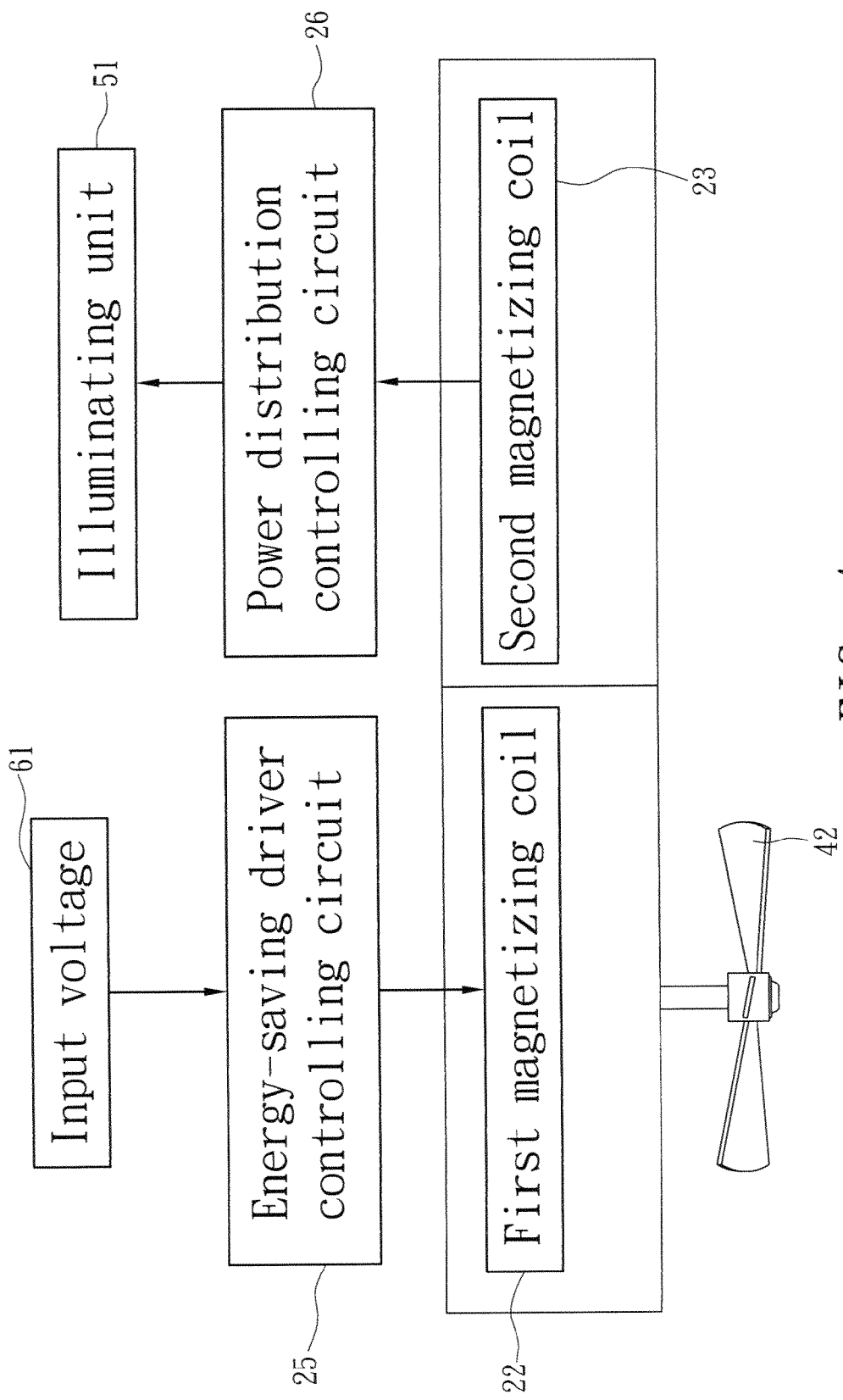
FIG. 4 is a schematic view of the controlling circuits in the invention.

The stator 21 is fixed on the motor axle 11. In this embodiment, the stator 21 is formed by stacking a predetermined number of metal plates. The stator 21 is surrounded with a plurality of first magnetizing coils 22, each of which is winded with a second magnetizing coil 23 with a generator winding. The second magnetic coil 23 detects the receives a back emf around it. As shown in FIG. 3, the stator 21 has a predetermined number of equally spaced coil arms 24 in the perpendicular direction toward the motor axle 11. Each of the coil arms 24 has a concave section 241 for the corresponding first magnetizing coil 22 to wind around. The second magnetizing coil 23 further winds around the corresponding first magnetizing coil 22. In particular, each of the first magnetizing coils 22 is electrically connected with an energy-saving driver controlling circuit 25. The energy-saving driver controlling circuit 25 receives an input voltage 61 and controls the electrical current phases of the first magnetizing coils 22. The second magnetizing coil 23 is electrically connected with a power distribution controlling circuit 26 for converting the back emf detected and received by the second magnetizing coil 23 into electrical power for output.

The rotor 31 is pivotally mounted on the motor axle 11 through a bearing 32. In this embodiment, the rotor 31 has several magnetic objects 33 around the stator 21. The magnetic objects 33 can be permanent magnets. The rotor 31 is surrounded with several connecting parts 34 for fixing a blade frame 41. The blade frame 41 has several blades 42. The bottom of the blade frame 41 is pivotally installed with an illuminating unit 51.

In practice, each of the first magnetizing coils 22 is driven by the input voltage 61 to produce an induced magnetic field. The rotor 31 is thus driven to rotate with respect to the stator 21 and build up an inertia. When the rotor 31 rotates with respect to the stator 21, the rotor 31 rotates and cuts through the magnetic lines. A back emf is thus generated in the induced magnetic field. In this case, the second magnetizing coil 23 on the stator 21 detects the receives the back emf. The received emf is converted by the power distribution controlling circuit 26 into electrical power for output. In this embodiment, the power distribution controlling circuit 26 is electrically connected with the illuminating unit 51 at the bottom of the blade frame 41. The electrical power output from the power distribution controlling circuit 26 can drive the illuminating unit 51 at the bottom of the blade frame 41. Therefore, the illuminating unit 51 can produce light without additional electrical power.

However, it should be mentioned that the energy-saving driver con rolling circuit 25 can convert external AC power into DC power, and eliminate the power supply noise interference when the circuit is operating. The energy-saving driver controlling circuit 25 can detect the position of the rotor 31 in rotation, and therefore determine the electrical current phases of individual first magnetizing coils 22. In this embodiment, the energy-saving driver controlling circuit 25 has a predetermined number of Hall elements (not shown). Each of the Hall elements can detect the polarity of the rotator 31 in rotation. The energy-saving driver controlling circuit 25 can thus determine and control the electrical current phases of the first magnetizing coils for them to build up the inertia. The rotor 31 can thus continue its rotation with respect to the stator 21.

Moreover, the energy-saving driver controlling circuit 25 provides an energy-saving control means, which uses the input voltage 61 in an intermittent way to start the energy-saving driver controlling circuit 25. When the energy-saving driver controlling circuit 25 receives the input voltage 61, it controls the ON time of the first magnetizing coils 22. The rotor 31 is driven to rotate with respect to the stator 21 and maintain its inertia. When the energy-saving driver controlling circuit 25 does not receive the input voltage 61, the rotor 31 continues to rotate with respect to the stator 21 due to inertia. In this case, the rotor 31 still cuts through the magnetic lines and produces a back emf. Therefore, even when the energy-saving driver controlling circuit 25 does not receive the input voltage 61, the power distribution controlling circuit 26 still uses the back emf detected and received by the second magnetic coil 23 to generate electrical power. This can effectively increase the power generating efficiency. In the above-mentioned energy-saving control means, the power distribution circuit 26 and the energy-saving driver controlling circuit 25 have to cooperate closely in their signals.

Figure 5:
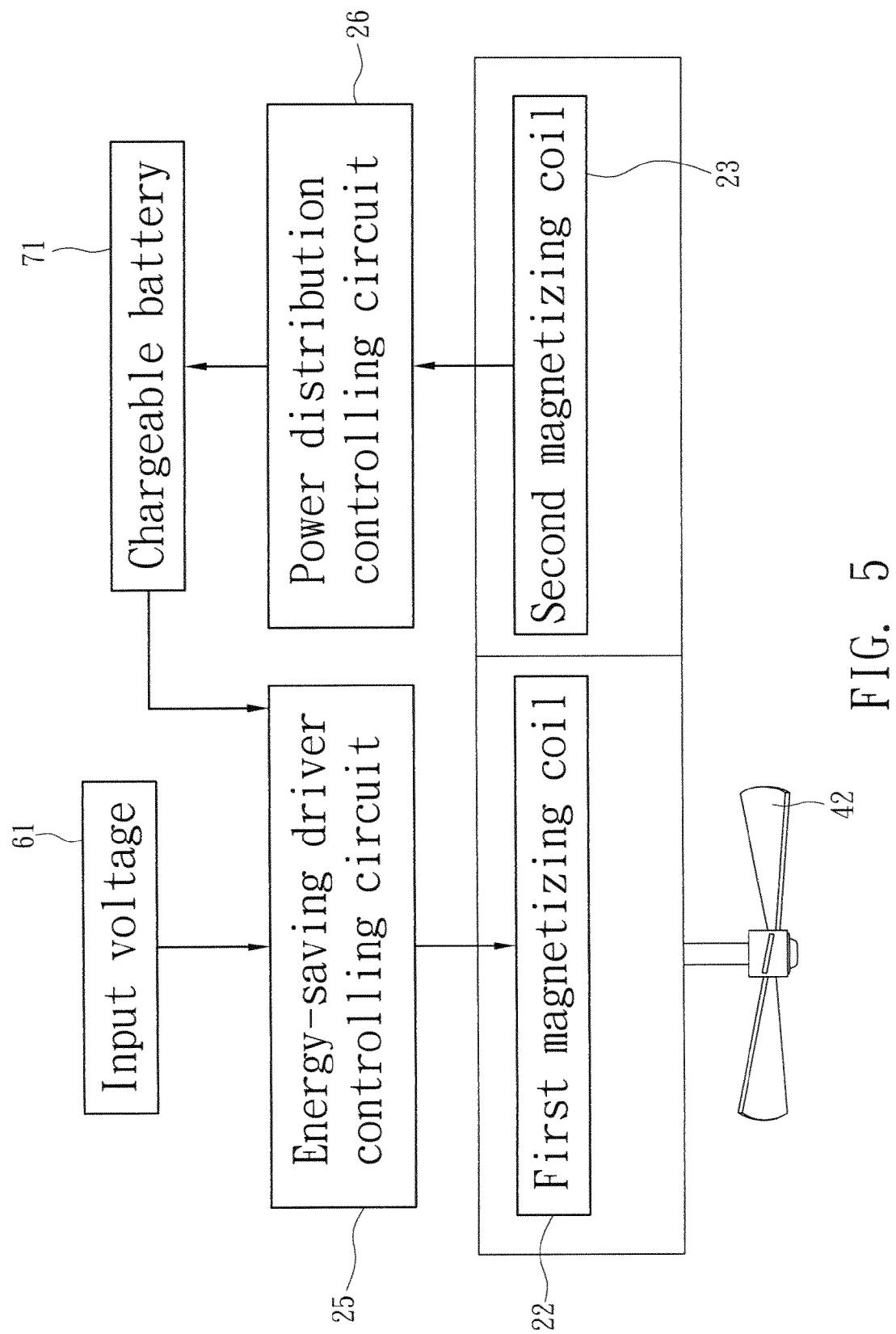
FIG. 5 is a schematic view of the controlling circuits according to the second embodiment of the invention.

Please refer to FIG. 5 for the second embodiment of the invention. It differs from the previous embodiment in that the power distribution controlling circuit 26 is electrically connected with a chargeable battery 71. The electrical power output from the power distribution controlling circuit 26 charges the chargeable battery 71. The chargeable battery 71 is further electrically connected with the energy-saving driver controlling circuit 25. When the external power supply stops supplying power, the chargeable battery 71 can still supply power to the energy-saving driver controlling circuit 25.

Figure 6:
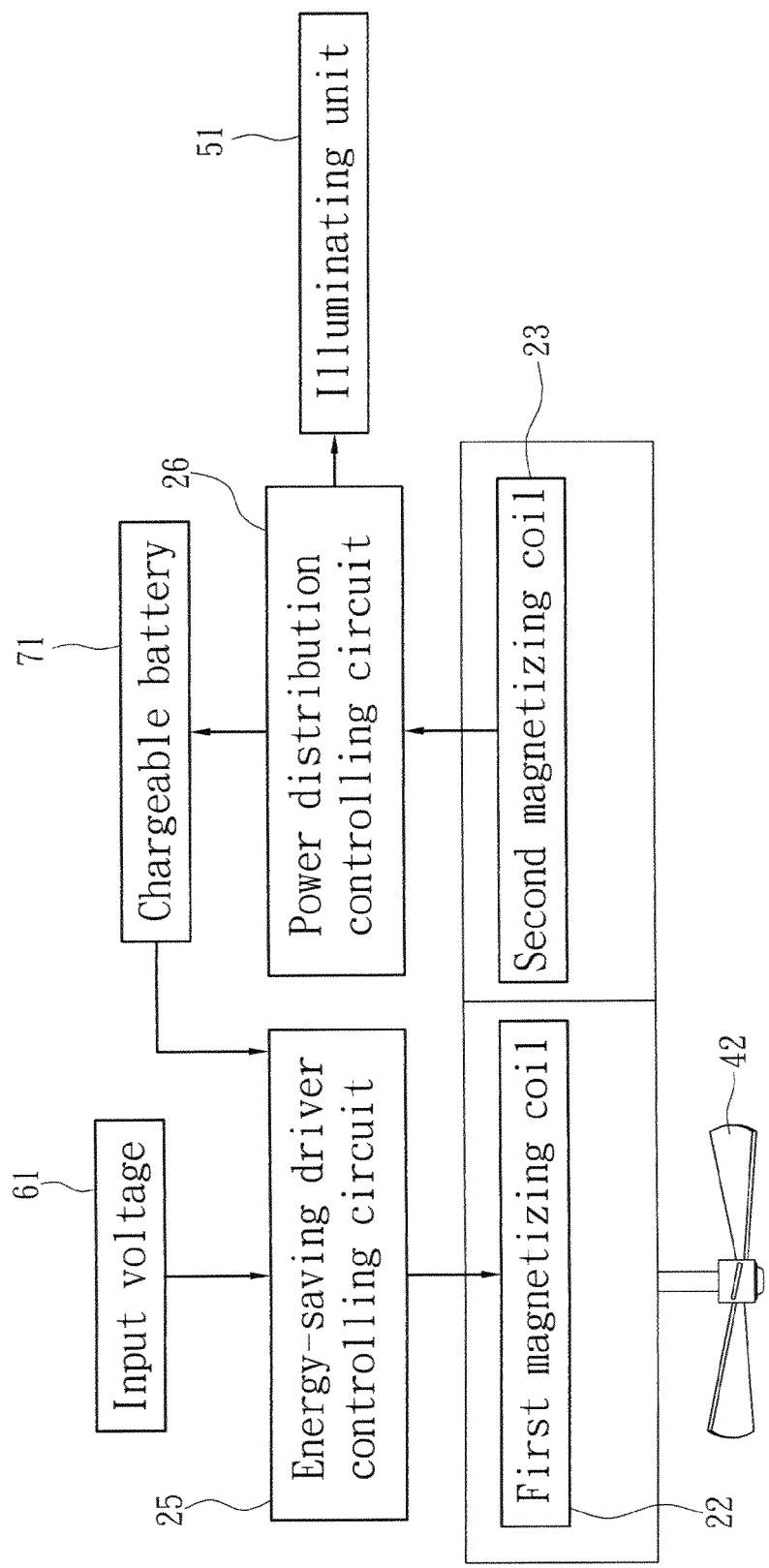
FIG. 6 is a schematic view of the controlling circuits according to the third embodiment of the invention.
Figure 7:
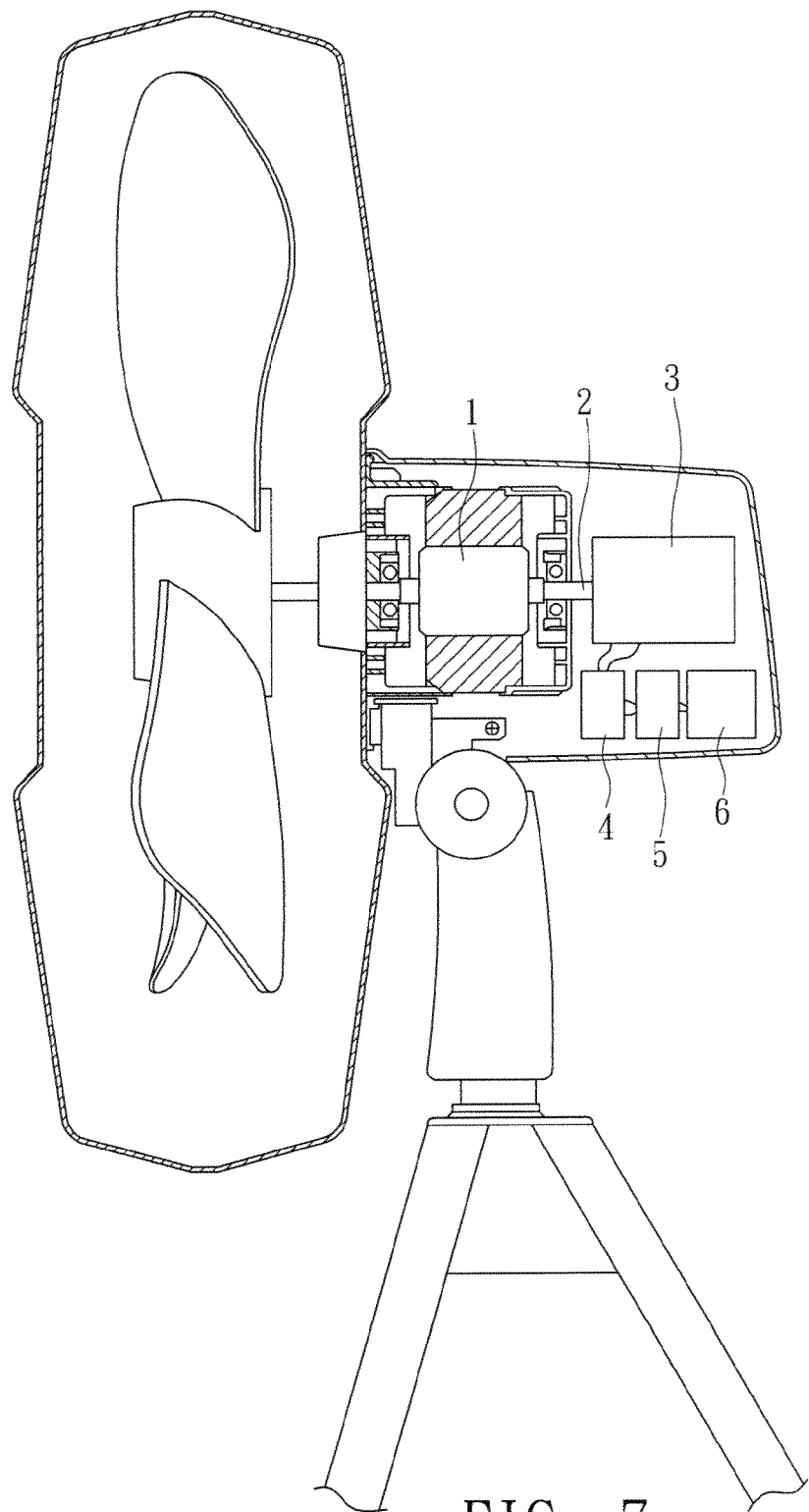
FIG. 7 is a schematic view of a conventional energy-saving generator device.

FIG. 6 shows the third embodiment of the invention. The power distribution controlling circuit 26 is further electrically connected with an illuminating unit 51 and a chargeable butte 71. The chargeable battery 71 is electrically connected with the energy-saving driver controlling circuit 25. Therefore, the electrical power output from the power distribution controlling circuit 2 can be used to drive the illuminating unit 51 at the bottom of the blade frame 41 and produce light. When the electrical power produced by the power distribution controlling circuit 26 is greater than the power consumed by the illuminating unit 51, the excess power can be used to charge the chargeable battery 71. When the external power supply stops supplying power, the energy-saving driver controlling circuit 25 can still operate normally under the power supply of the chargeable battery 71.

The invention as disclosed above has the following advantages:

1. The first magnetizing coil 22 of the stator 21 in the invention is directly winded with a second magnetizing coil 23 with a generator winding. Therefore, it achieves the effect of generating power without increasing too much of the motor load.

2. By directly winding a second magnetizing coil 23 with a generator winding on the first magnetizing coil 22 according to the invention, the volume and cost of the invention can be greatly reduced. The first magnetizing coil 22 and the second magnetizing coil 23 share the magnetic objects 33 on the rotor 31. Therefore, the production cost of the invention can be reduced.

3. The invention uses the second magnetizing coil 23 to detect and receive the back emf produced because the rotor 31 rotates and cuts through the magnetic lines. The back emf is used by the power distribution controlling circuit 26 to generate electrical power. Therefore, without additional power supply, the invention can light up an illuminating unit 51 or charge a chargeable battery 71. Therefore, the invention can save energy and reduce the utility cost.

4. The invention further uses an energy-saving means on the energy-saving driver controlling circuit 25 to supply the input voltage 61 in an intermittent way to the energy-saving driver controlling circuit 25. This helps reducing the electrical power. When the energy-saving driver controlling circuit 25 does not receive the input voltage 61, the rotor 31 still rotates with respect to the stator 21 due to inertia and produces a back emf. In this case, the power distribution controlling circuit 26 can still use the back emf detected and received by the second magnetizing coil 23 to generate electrical power. This effectively increases the power generating efficiency of the invention.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:
1. A ceiling fan motor with a generator winding comprising a stator and a rotor, wherein the stator is fixed on a motor axle and surrounded with a plurality of first magnetizing coils, each of which is winded with a second magnetizing coil with a generator winding;

the rotor is pivotally mounted on the motor axle and has a plurality of magnetic objects around the stator; each of the first magnetizing coils is driven by an input voltage to generate an induced magnetic field for the rotor to rotate with respect to the stator; and the second magnetizing coil of the stator detects and receives a back electromotive force (emf) produced as the rotor rotates and cuts through the magnetic lines and generates electrical power.

2. The ceiling fan motor with a generator winding of claim 1, wherein the stator is formed with a predetermined number of equally spaced coil arms in the perpendicular direction toward the rotor axle, each of the coil arms has a concave section, and each of the first magnetizing coils winds around the corresponding concave section of the coil arm.

3. The ceiling fan motor with a generator winding of claim 1 further comprising an energy-saving driver controlling circuit and a power distribution controlling circuit, wherein the energy-saving driver controlling circuit is electrically connected with the first magnetizing coils and receives the input voltage to control the electrical current phases of the first magnetizing coils, driving the rotor to rotate with respect to the stator and build up an inertia, the power distribution controlling circuit is electrically connected with the second magnetizing coils for converting the back emf detected and received by the second magnetizing coils into electrical power for output.

4. The ceiling fan motor with a generator winding of claim 3, wherein the energy-saving driver controlling circuit detects the position of the rotor in rotation and thereby determines and controls the electrical current phase of each of the magnetizing coils.

5. The ceiling fan motor with a generator winding of claim 3, wherein the electrical power output form the power distribution controlling circuit drives an illuminating unit.

6. The ceiling fan motor with a generator winding of claim 3, wherein the electrical power output from the power distribution controlling circuit charges a chargeable battery that is electrically connected with the energy-saving driver controlling circuit.

7. The ceiling fan motor with a generator winding of claim 3, wherein the electrical power output from the power distribution controlling circuit drives an illuminating unit and charges a chargeable battery, the chargeable battery being electrically connected with the energy-saving driver controlling circuit and the illuminating unit.

8. The ceiling fan motor with a generator winding of claim 3, wherein the energy-saving driver controlling circuit has an energy-saving control means that uses the input voltage to intermittently start the energy-saving driver controlling circuit;

the energy-saving driver controlling circuit controls the ON time of the first magnetizing coils when receiving the input voltage, driving the rotor to rotate with respect to the stator and maintain its inertia; and the rotor continues to rotate with respect to the stator due to inertia when the energy-saving driver controlling circuit does not receive the input voltage, and the rotor still cuts through magnetic lines and produces a back emf so that the power distribution controlling circuit uses the back emf detected and received by the second magnetizing coil to generate electrical power.

\* \* \* \* \*